United States Patent
Zhou et al.

(10) Patent No.: US 10,841,934 B2
(45) Date of Patent: Nov. 17, 2020

(54) PRIORITY RULE FOR SIGNAL REPETITION COLLISIONS

(71) Applicant: QUALCOMM Incorporated, San Diego, CA (US)

(72) Inventors: Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/124,793

(22) Filed: Sep. 7, 2018

(65) Prior Publication Data

US 2019/0166607 A1     May 30, 2019

Related U.S. Application Data

(60) Provisional application No. 62/590,958, filed on Nov. 27, 2017.

(51) Int. Cl.
*H04W 72/12*     (2009.01)
*H04W 74/08*     (2009.01)
(Continued)

(52) U.S. Cl.
CPC ....... *H04W 72/1247* (2013.01); *H04L 1/1812* (2013.01); *H04L 5/0048* (2013.01);
(Continued)

(58) Field of Classification Search
CPC . H04L 1/1812; H04L 25/0228; H04L 5/0048; H04L 5/0055; H04W 16/14; H04W 72/0413; H04W 72/1247; H04W 74/0841
See application file for complete search history.

(56) References Cited

U.S. PATENT DOCUMENTS

2013/0286991 A1    10/2013   Yang et al.
2014/0269524 A1    9/2014   Xiao et al.
(Continued)

FOREIGN PATENT DOCUMENTS

WO     2016122258 A1     8/2016

OTHER PUBLICATIONS

Huawei et al., "Remaining Details on SRS Switching among CCs", 3GPP Draft; R1-1719446, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 17, 2017, XP051369147, Retrieved from the Internet: URL:http://www.3gpp.org/ftp/tsg%5Fran/WG1% 5FRL1/TSGR1%5F91/Docs/ [retrieved on Nov. 17, 2017], 9 pages.
(Continued)

*Primary Examiner* — Gbemileke J Onamuti
(74) *Attorney, Agent, or Firm* — Arent Fox, LLP

(57) ABSTRACT

A method, a computer-readable medium, and an apparatus are provided that present a solution to the problem of potential collisions between repetitions of a signal and resources scheduled for another signal. The apparatus determines that a repetition of a channel signal will collide with a resource scheduled for another channel and applies a priority rule to determine whether to transmit the repetition or to refrain from transmitting the repetition. The apparatus then transmits the repetition when the priority rule indicates to transmit the repetition. The apparatus may also refrain from transmitting the repetition when the priority rule indicates that the other signal has a higher priority than the repetition.

33 Claims, 9 Drawing Sheets

(51) Int. Cl.
  *H04W 72/04* (2009.01)
  *H04W 16/14* (2009.01)
  *H04L 5/00* (2006.01)
  *H04L 25/02* (2006.01)
  *H04L 1/18* (2006.01)

(52) U.S. Cl.
  CPC ........ *H04L 5/0055* (2013.01); *H04L 25/0228* (2013.01); *H04W 16/14* (2013.01); *H04W 72/0413* (2013.01); *H04W 72/1242* (2013.01); *H04W 74/0841* (2013.01)

(56) References Cited

U.S. PATENT DOCUMENTS

| | | | |
|---|---|---|---|
| 2017/0027013 A1* | 1/2017 | Kim | H04W 72/04 |
| 2017/0303217 A1* | 10/2017 | Lee | H04J 11/00 |
| 2018/0007667 A1 | 1/2018 | You et al. | |
| 2018/0070352 A1* | 3/2018 | Takeda | H04L 1/1671 |
| 2018/0176000 A1* | 6/2018 | Lee | H04L 1/1822 |

OTHER PUBLICATIONS

International Search Report and Written Opinion—PCT/US2018/056919—ISA/EPO—Dec. 19, 2018.
Samsung: "Priority Dropping Rules for Collision Handling", 3GPP Draft; R1-1612432 SRS Collisions, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 5, 2016, XP051190434, Retrieved from the Internet: URL:http://www.3gpp.org/ftp/tsg_ran/WG1_RL1/TSGR1_87/Docs/ [retrieved on Nov. 5, 2016], 3 pages.

* cited by examiner

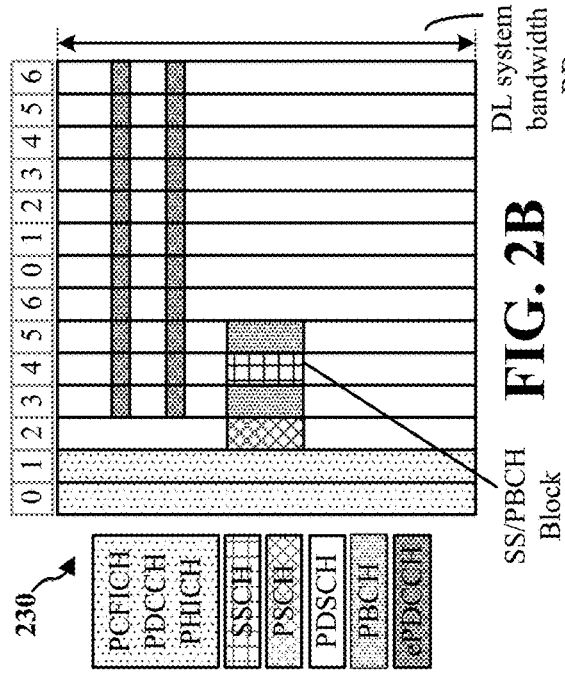
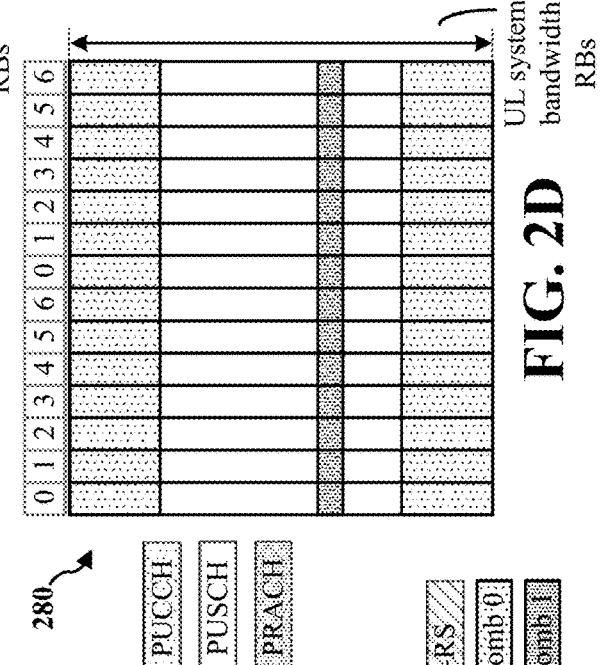
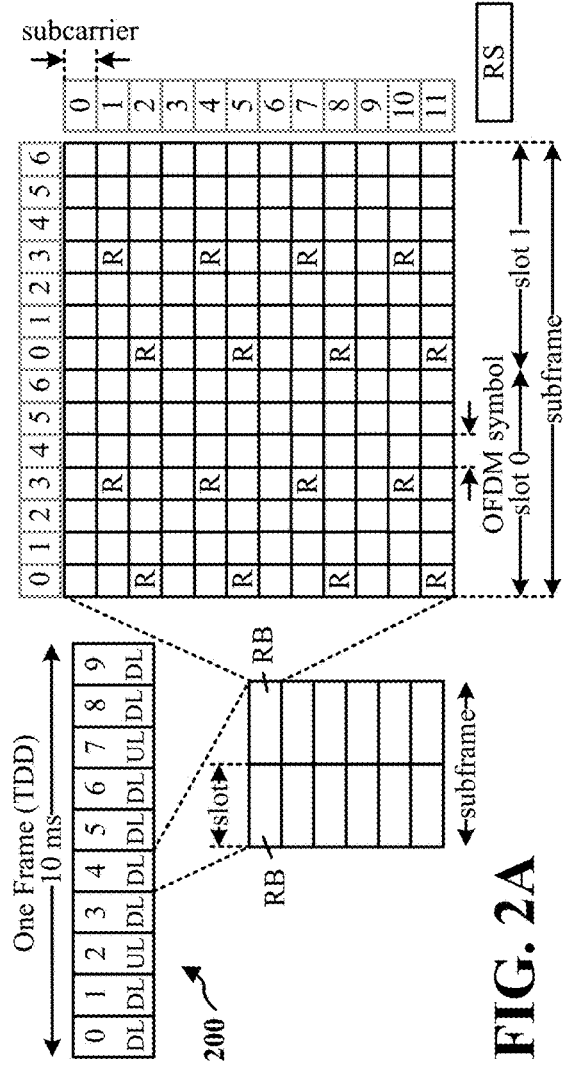
FIG. 2A  FIG. 2B  FIG. 2C  FIG. 2D

PRIORITY RULE FOR SIGNAL REPETITION COLLISIONS

CROSS-REFERENCE TO RELATED APPLICATION

This application claims the benefit of U.S. Provisional Application Ser. No. 62/590,958, entitled "Priority Rule for Signal Repetition Collisions" and filed on Nov. 27, 2017, which is expressly incorporated by reference herein in its entirety.

BACKGROUND

Technical Field

The present disclosure relates generally to communication systems, and more particularly, to signal repetitions that may collide with a resource for another signal transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A signal may have an initial transmission followed by repetitions of the same signal. For example, in millimeter wave (mmW) communication, repetitions may be used for range extension. However, at times, repetitions of the signal may collide with resources scheduled for another signal. Aspects presented herein address the challenge of handling such potential collisions between repetitions of a signal and resources scheduled for another signal. The present application provides a solution in which the transmitter applies a priority rule for repetitions of the signal in order to determine how to handle the potential collision.

In an aspect of the disclosure, a method, a computer-readable medium, and an apparatus are provided. The apparatus determines that a repetition of a channel signal will collide with a resource scheduled for another channel and applies a priority rule to determine whether to transmit the repetition or to refrain from transmitting the repetition. The apparatus then transmits the repetition when the priority rule indicates to transmit the repetition. The apparatus may also refrain from transmitting the repetition when the priority rule indicates that the other signal has a higher priority than the repetition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
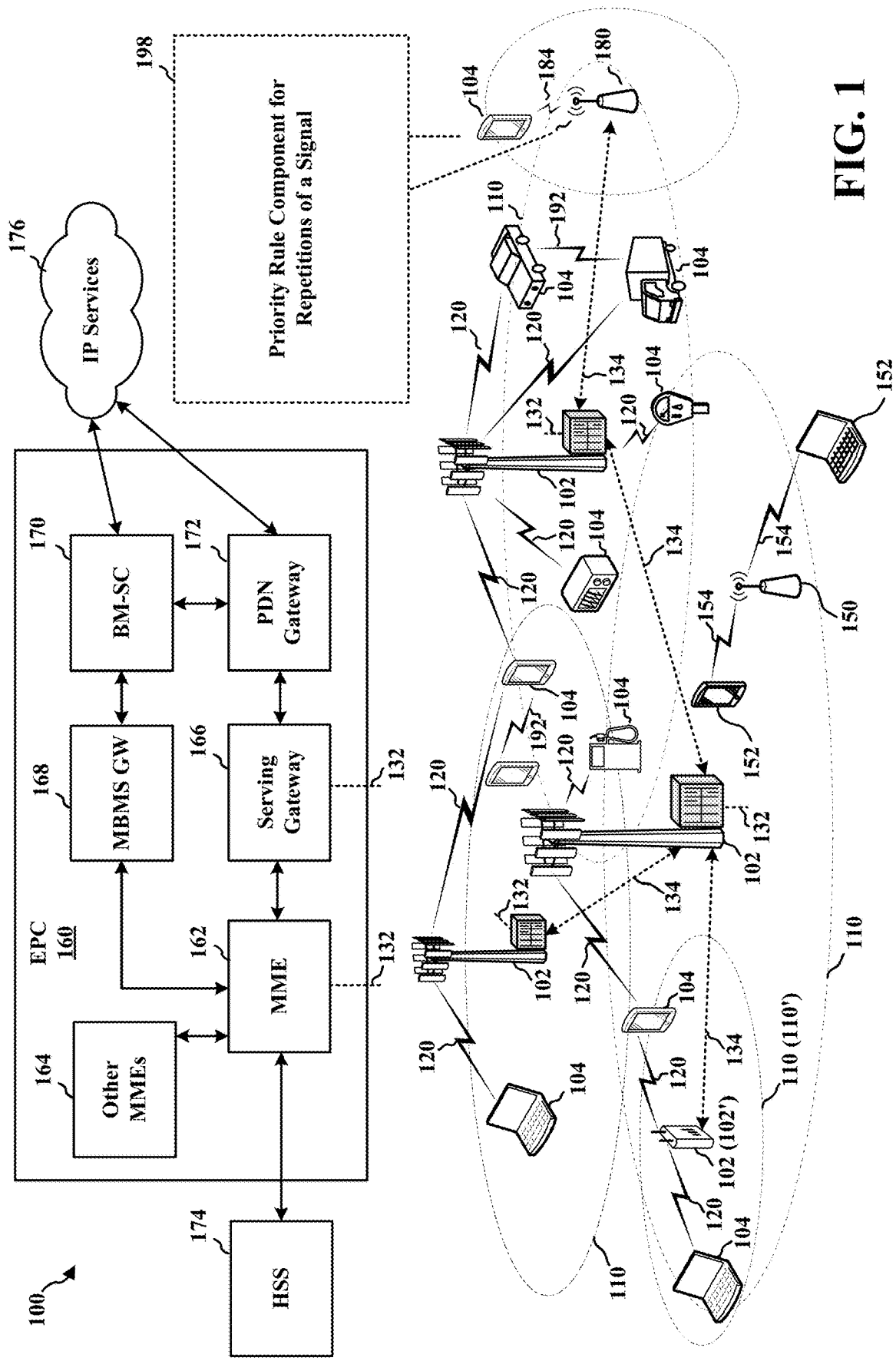
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 and/or UE 104 may be configured to include a priority rule component for repetitions of a signal 198, e.g., such as described in connection with FIGS. 4-9.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
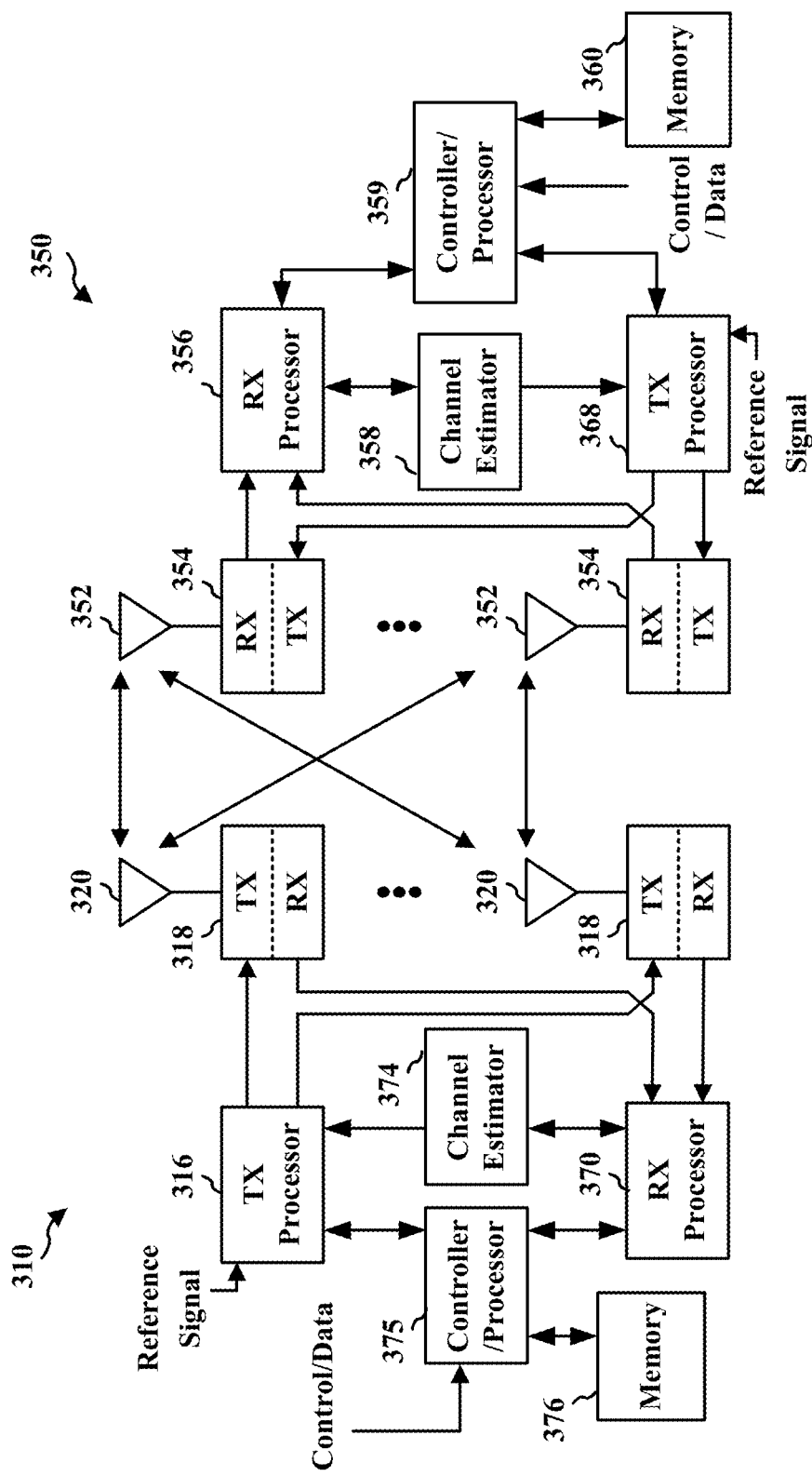
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
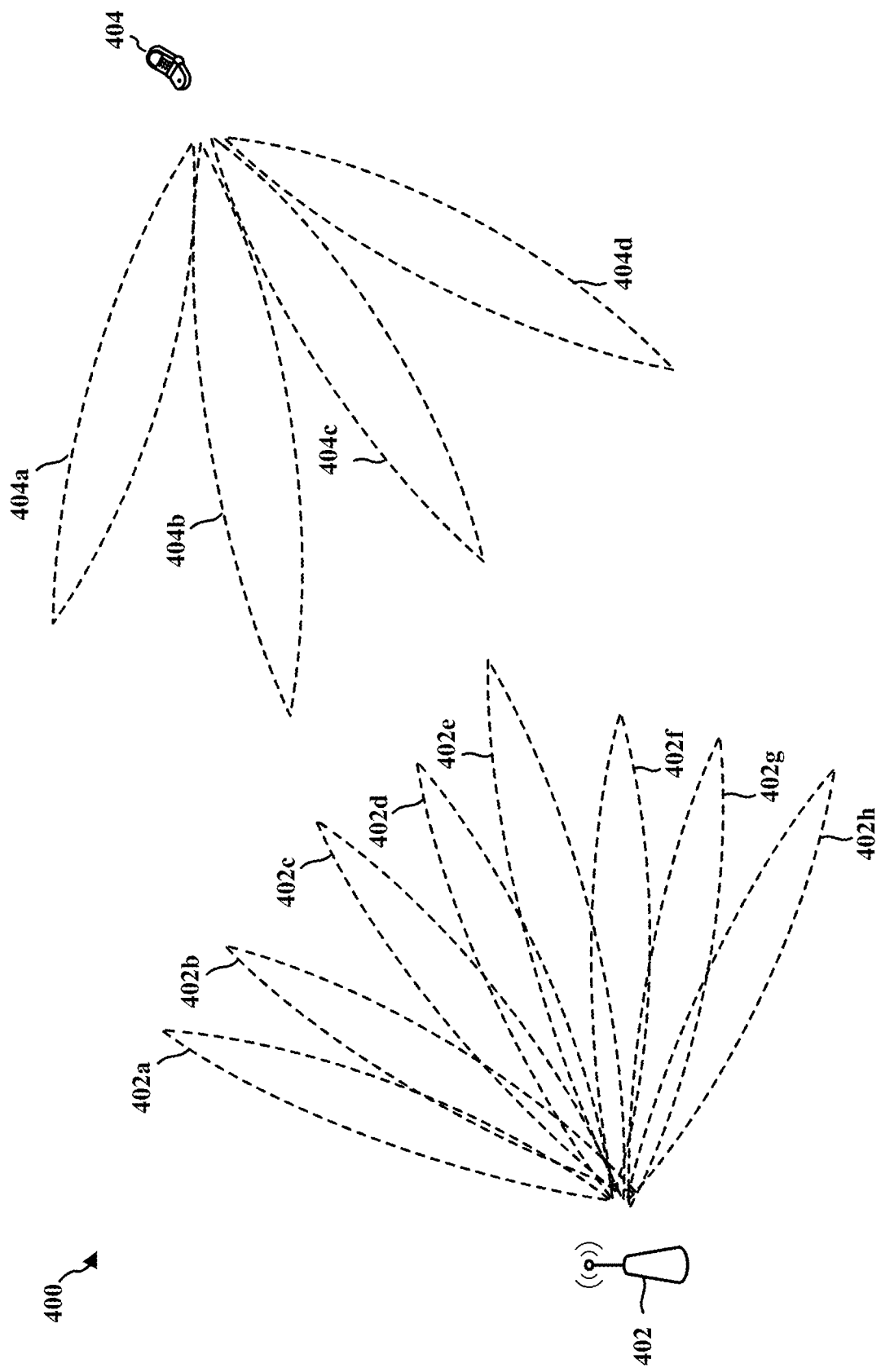
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In 5G NR, a signal may have an initial transmission followed by repetitions of the same signal. For example, mmW communication may include signal repetitions, e.g., for range extension. However, at times, repetitions of the signal may collide with resources scheduled for another signal. Aspects presented herein address the challenge of handling such potential collisions between repetitions of a signal and resources scheduled for another signal. For example, base stations and/or UEs may apply a priority rule for repetitions of the signal to determine how to handle an overlap between such scheduled resources and signal repetitions.

An apparatus for wireless communication, e.g., a UE or base station, may determine that a repetition of a signal for a first channel signal will collide with a resource scheduled for a second channel. The apparatus may determine whether to transmit the signal for the first channel or to refrain from transmitting the signal for the first channel based on the signal being a repetition. For example, the apparatus may apply a priority rule for the repetition of the signal for the first channel when the signal would overlap with resources scheduled for a second channel.

As one example, a time division duplex (TDD) Random Access Channel (RACH) configuration may map RACH resources onto slots irrespective of time locations of actual transmitted signals, such as SS or PBCH blocks. A priority rule may help to determine how to handle an overlap between such RACH resources and other signals.

Figure 5:
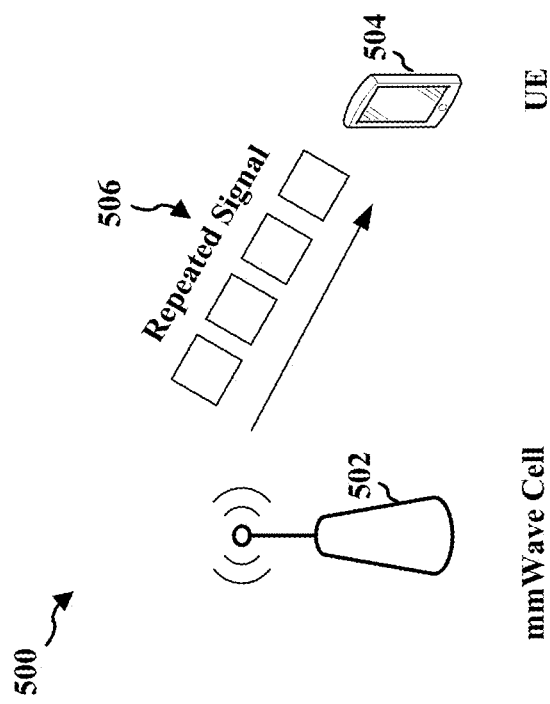
FIG. 5 is a diagram illustrating a base station in communication with a UE.

FIG. 5 illustrates a mmW communication system 500 in which a base station 502 transmits a signal 506 to UE 504. As illustrated in FIG. 5, the base station may transmit the signal to the UE multiple times, e.g., transmitting the signal an initial time and then repeating the same signal multiple times to assist the UE in receiving the signal. In one example, the signal may comprise PBCH.

The repetitions of the signal 506 may collide with other signal channels/transmissions. While this example is presented for PBCH, the same issue may arise with repetitions of other channels, including both downlink and uplink channels. For example, the issue may arise for repetitions of any of PDCCH, PDSCH, CSI-RS, PRACH, PUCCH, PUSCH, SRS, etc. Thus, while this example in FIG. 5 illustrates the base station 502 transmitting the signal, the UE 504 may similarly employ repetition in transmitting signals to the base station 502. Such repetitions from the UE may similarly have potential collisions with resources scheduled for other signal channels/transmissions.

Aspects presented herein address the challenge of handling such potential collisions between repetitions of a signal and resources scheduled for another signal. The present application provides a solution in which the transmitter applies a priority rule for repetitions of the signal in order to determine how to handle the potential collision.

Figure 6:
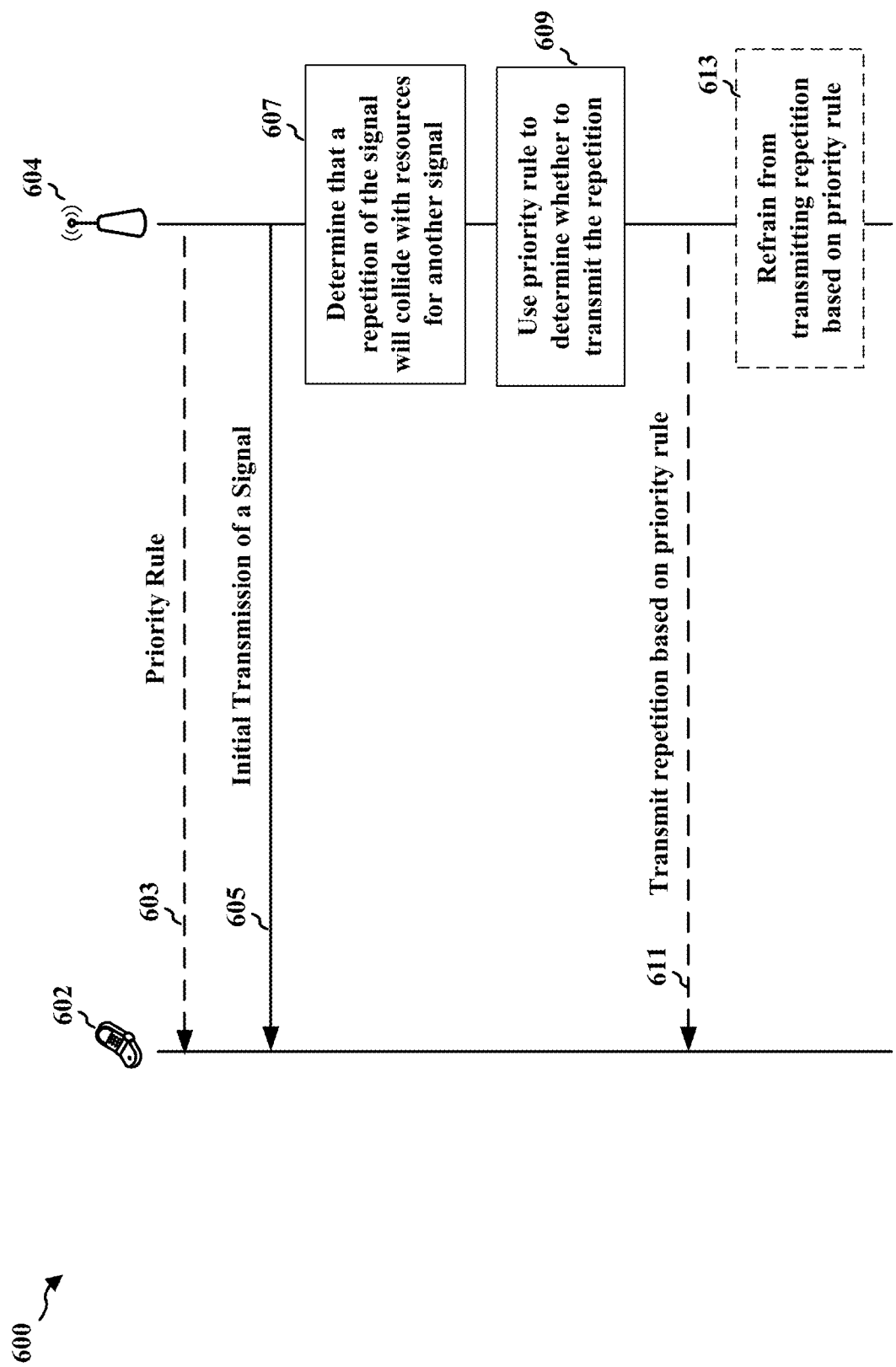
FIG. 6 is a communication flow diagram illustrating communication between a base station and a UE.

FIG. 6 illustrates an example communication flow 600 between a UE 602 and a base station 604. At 605, the base station performs an initial transmission of a signal. At 607, the base station determines that a repetition of the initial signal transmitted at 605 will collide with resources for another signal channel/transmission. At 609, the base station may apply a repetition priority rule to determine how to handle the colliding repetition, e.g., whether to transmit the repetition or refrain from transmitting the repetition.

In one example, the initial transmission at 605 may comprise a PBCH transmission. Thus, the repetition priority rule may indicate the priority of the PBCH repetition in comparison to the other signal. The other signal may comprise a PRACH signal, which may be configured as a periodic, semi-persistent, or aperiodic signal. The priority rule may indicate the priority of a PBCH repetition relative to resources for a PRACH signal. The other signal may comprise a CSI-RS signal or a corresponding report, which may be configured as a periodic, semi-persistent, or aperiodic signal. The CSI-RS may be transmitted for CSI feedback or for beam management. The priority rule may indicate the priority of a PBCH repetition relative to resources for a CSI-RS signal and/or for the corresponding report. The other signal may comprise an SRS signal, which may be configured as a periodic, semi-persistent, or aperiodic signal. The SRS may be transmitted to provide CSI measurement or for cross-link interference measurement and the corresponding reports. The priority rule may indicate the priority of a PBCH repetition relative to resources for a SRS signal and/or a corresponding report. The other signal may comprise a PUCCH transmission and/or a PUSCH transmission, e.g., comprising uplink control information (UCI). For example, the PUCCH/PUSCH may comprise any of an acknowledgement (ACK), a negative acknowledgement (NACK), a scheduling request (SR), or a channel quality indicator (CQI). The priority rule may indicate the priority of a PBCH repetition relative to resources for a PUCCH transmission and/or a PUSCH transmission. The priority rule may be specific to a PUCCH/PUSCH transmission comprising UCI. The priority rule may be specific to the type of UCI comprised in the PUCCH/PUSCH transmission. The other signal may comprise an uplink data in a PUSCH transmission. The resources scheduled for the uplink transmission may be semi-static. In another example, there may be a dynamic downlink/uplink configuration. As the shared channel may have a dynamic DL/UL configuration, at times the channel signal repetition from the base station may begin in a DL portion and may be scheduled to continue into the UL portion. Thus, the priority rule may indicate to the base station whether to go forward with transmitting the repetition in the UL portion or to refrain from transmitting the repetition that would continue into the UL portion.

The priority rule may address the priority of the repetition with respect to an initial transmission of the other channel's signal. The other channel may also employ repetitions. Thus, at times, the repetition of the signal channel may overlap not an initial transmission of another channel signal, but a repetition of that other channel signal. The priority rule may also address the priority levels for the potential collision between repetitions. Thus, the base station 604 may determine to refrain from transmitting an original transmission of the channel signal when the original transmission would collide with resources scheduled for another channel, whereas the base station 604 may determine to transmit a repetition of the channel signal when the repetition would collide with resources scheduled for another channel.

While this example is described for a repetition of PBCH, collisions may similarly occur for other downlink repetitions from the base station or for other uplink repetitions from the UE 602. As described in connection with FIG. 5, collisions may occur for repetitions of PUCCH from a UE. As noted above, the other signal with which the repetitions of the PUCCH will collide may comprise a PUSCH transmission. The PUSCH transmission may comprise UCI, e.g., any of an ACK/NACK, an SR, and/or a CQI.

In FIG. 6, the base station may transmit the repetition, at 611, based on the repetition priority rule. For example, the priority rule may indicate that the repetition has a higher priority than the channel/transmission with which it will collide. Similarly, the base station may refrain from transmitting the repetition, at 613, when the priority rule indicates that the repetition has a lower priority than the channel/transmission with which it will collide.

In a first example, the priority rule may indicate that the repetition of the channel signal has a same priority as an original transmission of the channel signal. In this example, the base station or UE may apply a priority rule for the signal without regard to whether it is the initial transmission or a repetition.

In a second example, the priority rule may indicate that the repetition of the channel signal has a higher priority than transmissions on other channels. For example, the repetition priority rule may indicate that the repetition of the signal always has a higher priority, e.g., overwrites, the other channel. In the example, described above for a potential collision between repetitions of PUCCH and resources for PUSCH, the priority rule may indicate that the repetition of the PUCCH should be transmitted. This may be different than the result for the initial PUCCH transmission.

In a third example, the priority rule may indicate to refrain from transmitting the repetition when a collision is detected for the repetition. For example, the priority rule may indicate that the other channel always has a higher priority, e.g., overwrites, the repetition.

The priority rule may be received in signaling from a cell, e.g., in signaling from a base station to a user equipment, e.g., as illustrated at 603. For example, the priority rule may be indicated in System Information broadcast by a cell. The priority rule may be indicated in a control element. This enables the cell to dynamically signal the priority rule.

Figure 7:
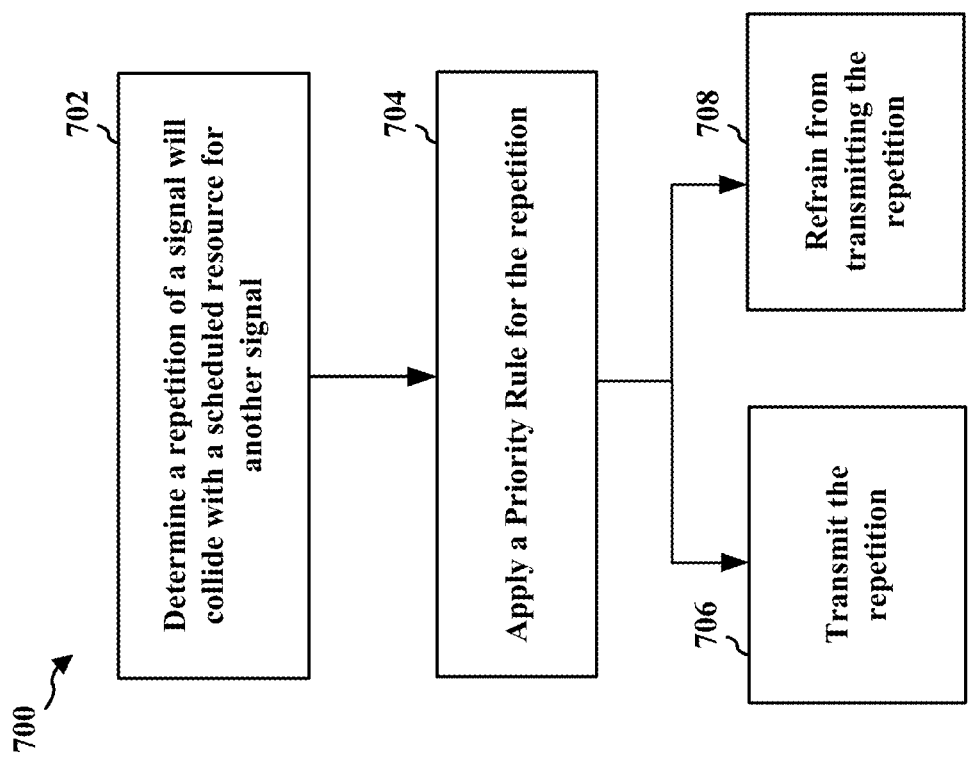
FIG. 7 is a flowchart of a method of wireless communication.

FIG. 7 is a flowchart 700 of a method of wireless communication. The method may be performed by a base station (e.g., base station 102, 180, 310, 402, 502, 604, the apparatus 802, 802') when a colliding repetition is for a downlink signal. In another example, the method may be performed by a UE (e.g., UE 104, 350, 404, 504, 602, 850) when a colliding repetition is for an uplink signal. At 702, the base station or UE determines that a repetition of a channel signal will collide with a resource scheduled for another channel.

At 704, the base station or UE applies a priority rule to determine whether to transmit the repetition or to refrain from transmitting the repetition. The resource scheduled for the other channel may comprise an original transmission of the channel signal. The resource scheduled for the other channel may comprise a repetition transmission of the channel signal. The priority rule may be different depending on whether the other channel colliding with the repetition is an original transmission or a repetition.

In a first example, the priority rule may indicate that the repetition of the channel signal has a same priority as an original transmission of the channel signal. In this example, the base station or UE may apply a priority rule for the signal without regard to whether it is the initial transmission or a repetition.

In a second example, the priority rule may indicate that the repetition of the channel signal has a higher priority than transmissions on other channels. For example, the repetition priority rule may indicate that the repetition of the signal always has a higher priority, e.g., overwrites, the other channel.

In a third example, the priority rule may indicate to refrain from transmitting the repetition when a collision is detected for the repetition. For example, the priority rule may indicate that the other channel always has a higher priority, e.g., overwrites, the repetition.

The priority rule may be received in signaling from a cell, e.g., in signaling from a base station to a user equipment. For example, the priority rule may be indicated in System Information broadcast by a cell. The priority rule may be indicated in a control element. This enables the cell to dynamically signal the priority rule.

In one example, the channel signal may comprise a PBCH to be transmitted by a base station. In this example, the method in FIG. 7 would be performed by the base station to determine whether to transmit the PBCH repetition when the collision is detected. A PBCH may collide with resources for any of a RACH, CSI-RS, SRS, PUCCH, PUSCH, UCI, etc.

PBCH is merely one example of a channel signal for which a repetition may collide with resources scheduled for another signal. In other examples, the repetition may be for PDCCH, PDSCH, CSI-RS, etc. transmitted by a base station. In additional examples, a UE may detect a collision between a repetition of an uplink channel and resources scheduled for another channel. In this example, the repetition may be for any of a PRACH, PUCCH, PUSCH, SRS, etc.

Thus, the resource scheduled for the other channel may comprise a random access channel, e.g., PRACH. The PRACH for which the collision is detected and for which the priority rule applies may be configured as a periodic channel transmission, a semi-persistent channel transmission, or an aperiodic channel transmission.

In another example, the scheduled resource for the other channel may comprise a CSI-RS resource or a resource for a corresponding report. The CSI-RS for which the collision is detected and for which the priority rule applies may be configured as a periodic channel transmission, a semi-persistent channel transmission, or an aperiodic channel transmission.

In another example, the scheduled resource for the other channel may comprise a sounding reference signal (SRS) resource. The SRS may be for CSI measurement or for cross-link interference measurement and/or a corresponding report. The SRS for which the collision is detected and for which the priority rule applies may be configured as a periodic channel transmission, a semi-persistent channel transmission, or an aperiodic channel transmission.

In another example, the other channel may comprise an uplink control channel, e.g., PUCCH, or an uplink shared channel, e.g., PUSCH, and the scheduled resource. The PUCCH or PUSCH may comprise an UCI resource. The UCI may comprise at least one of an ACK/NACK, an SR, or a CQI.

Thus, as described in connection with FIGS. 5 and 6, the repetition of the channel signal may comprise a PUCCH repetition. As well, the resource schedule for the other channel may comprise a resource for PUSCH. In this example, the method in FIG. 7 would be performed by a UE to determine whether to transmit the PUCCH repetition.

The resource scheduled for the other channel may comprise data traffic. For example, the other channel may comprise an uplink shared channel, e.g., PUSCH, and the scheduled resource may comprise a data transmission resource. The uplink shared channel may have a semi-static configuration or may have a dynamic DL/UL configuration. As the shared channel may have a dynamic DL/UL configuration, at times the channel signal repetition from the base station may begin in a DL portion and may be scheduled to continue into the UL portion. Thus, the priority rule may indicate to the base station whether to go forward with transmitting the repetition in the UL portion or to refrain from transmitting the repetition that would continue into the UL portion.

The priority rule may address the priority of the repetition with respect to an initial transmission of the other channel's signal. The other channel may also employ repetitions. Thus, at times, the repetition of the signal channel may overlap not an initial transmission of another channel signal, but a repetition of that other channel signal. The priority rule may also address the priority levels for the potential collision between repetitions.

At 706, the base station or UE transmits the repetition when the priority rule indicates to transmit the repetition. Similarly, at 708, the base station or UE may refrain from transmitting the repetition when the priority rule indicates that the repetition has a lower priority than the other signal.

Figure 8:
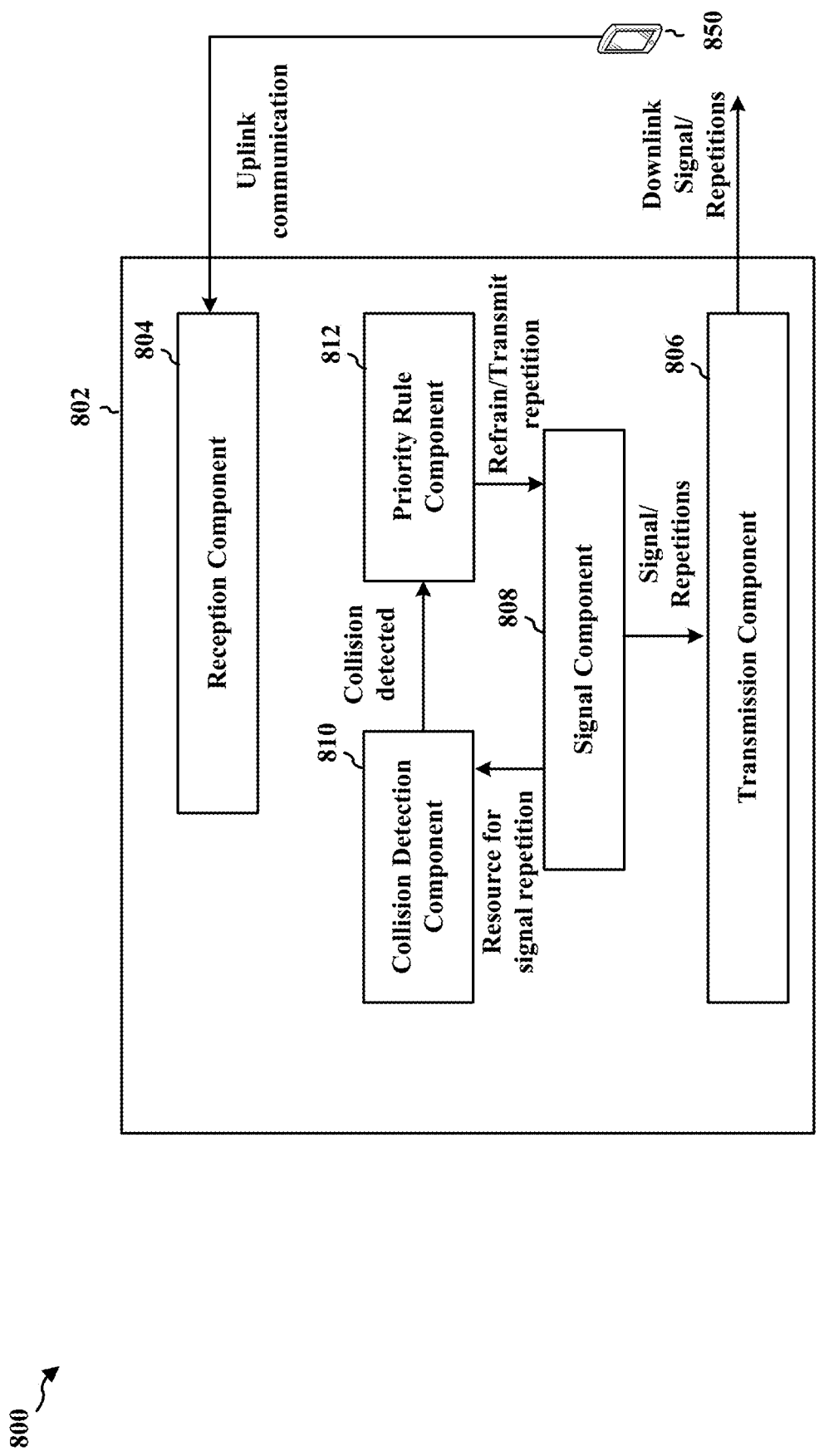
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a base station (e.g., base station 102, 180, 310, 402, 502, 604) or a UE (e.g., UE 104, 350, 404, 504, 602, 850). Although the apparatus is illustrated using an example of a base station, similarly components within a UE may perform similar functions, when the repetition is for a signal transmitted by a UE. The apparatus includes a reception component 804 that receives uplink communication from a UE 850 and a transmission component 806 that transmits downlink signals to the UE 850. The apparatus may include a collision detection component 810 configured to determine whether a repetition of a channel signal will collide with a resource scheduled for another channel. The collision detection component 810 may receive information about the resources that the repetition may occupy from signal component 808 and may similarly receive scheduling information from a component corresponding to the other signal, which is not illustrated. The apparatus may include a priority rule component 812 configured to apply a priority rule to determine whether to transmit the repetition or to refrain from transmitting the repetition. The apparatus may include a signal component 808 configured to transmit the repetition when the priority rule indicates to transmit the repetition, e.g., via the transmission component 806. The signal component 808 may similarly be configured to refrain from transmitting the repetition when the priority rule so indicates.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
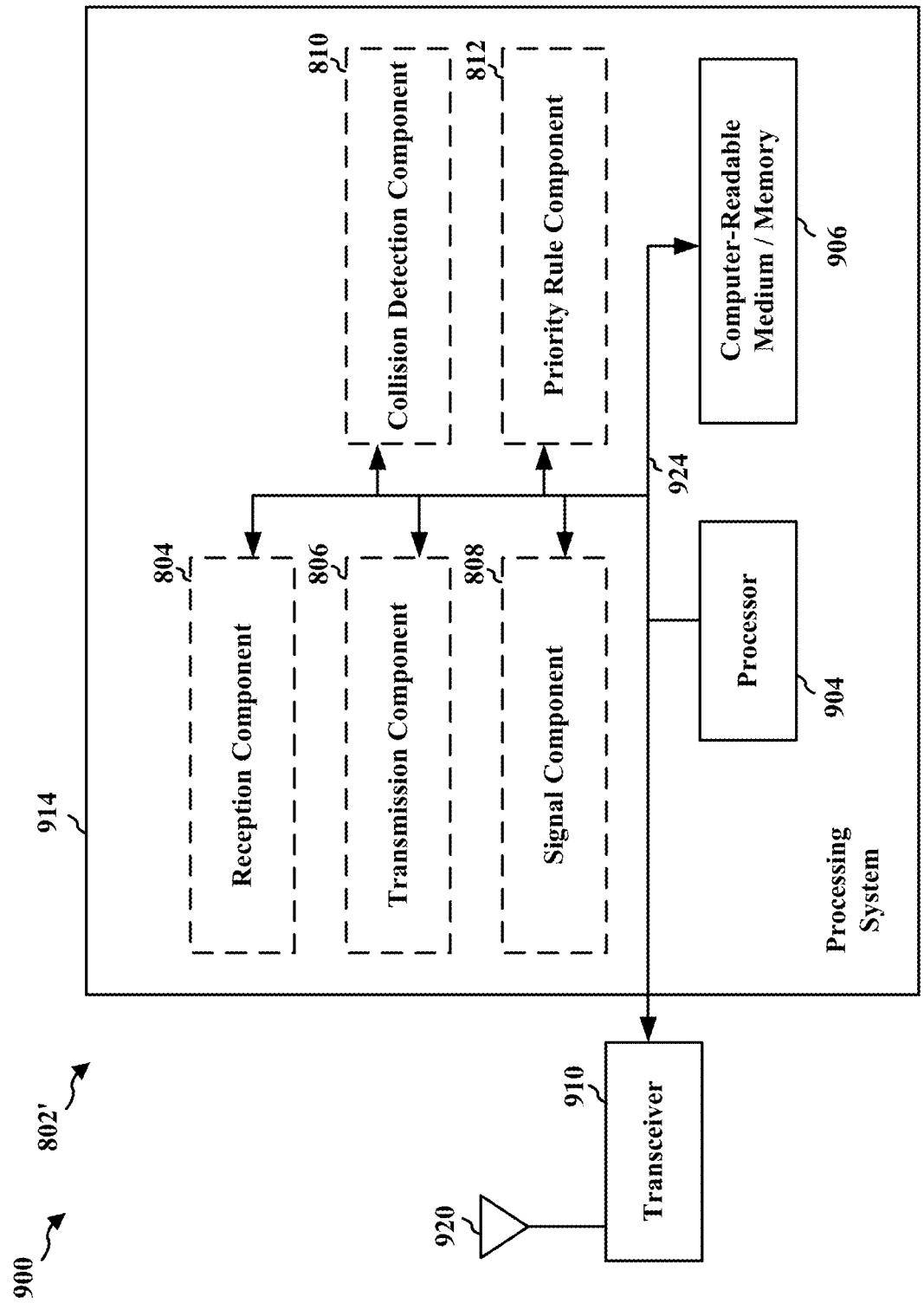
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In one configuration, the apparatus 802/802' for wireless communication includes means for determining that a repetition of a channel signal will collide with a resource scheduled for another channel, means for applying a priority rule to determine whether to transmit the repetition or to refrain from transmitting the repetition, and means for transmitting the repetition when the priority rule indicates to transmit the repetition. The aforementioned means may be one or more of the aforementioned components of the apparatus 802 and/or the processing system 914 of the apparatus 802' configured to perform the functions recited by the aforementioned means. For example, the means for determining may comprise collision detection component 810, means for applying a priority rule may comprise priority rule component 812, and means for transmitting the signal may comprise signal component 808 and/or transmission component 806. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   determining that a repetition of a channel signal will collide with a resource scheduled for another channel comprising an uplink shared channel that would include uplink control information;
   applying a priority rule to determine whether to transmit the repetition or to refrain from transmitting the repetition, wherein the priority rule covers the other channel comprising the uplink shared channel that would include the uplink control information; and
   transmitting the repetition when the priority rule indicates to transmit the repetition.

2. The method of claim 1, wherein the priority rule indicates that the repetition of the channel signal has a higher priority than transmission of the uplink shared channel that would include the uplink control information.

3. The method of claim 1, wherein the uplink control information comprises at least one of an acknowledgement, a negative acknowledgement, a scheduling request, or a channel quality indicator.

4. The method of claim 1, wherein the uplink shared channel comprises data traffic.

5. The method of claim 1, wherein the resource scheduled for the other channel comprises an original transmission of the channel signal.

6. The method of claim 1, wherein the resource scheduled for the other channel comprises a repetition transmission of the channel signal.

7. The method of claim 1, wherein the priority rule indicates that the repetition of the channel signal has a same priority as an original transmission of the channel signal.

8. The method of claim 1, wherein the priority rule indicates to refrain from transmitting the repetition when a collision is detected for the repetition.

9. The method of claim 1, wherein the priority rule is received in signaling from a base station to a user equipment.

10. The method of claim 1, wherein the channel signal comprises a physical broadcast channel (PBCH) signal.

11. The method of claim 10, wherein the resource scheduled for the other channel comprises a random access channel.

12. The method of claim 10, wherein the resource scheduled for the other channel comprises a channel state information reference signal (CSI-RS) resource or a corresponding report resource.

13. The method of claim 10, wherein the resource scheduled for the other channel comprises a sounding reference signal resource.

14. The method of claim 1, wherein the priority rule covers a physical uplink shared channel that is eligible to comprise the uplink control information.

15. The method of claim 1, wherein the repetition of the channel signal comprises the repetition of a physical uplink control channel (PUCCH).

16. An apparatus for wireless communication, comprising:
    means for determining that a repetition of a channel signal will collide with a resource scheduled for another channel comprising an uplink shared channel that would include uplink control information;
    means for applying a priority rule to determine whether to transmit the repetition or to refrain from transmitting the repetition, wherein the priority rule covers the other channel comprising the uplink shared channel that would include the uplink control information; and
    means for transmitting the repetition when the priority rule indicates to transmit the repetition.

17. The apparatus of claim 16, wherein the priority rule indicates that the repetition of the channel signal has a higher priority than transmission of the uplink shared channel that would include the uplink control information.

18. The apparatus of claim 16, wherein the uplink control information comprises at least one of an acknowledgement, a negative acknowledgement, a scheduling request, or a channel quality indicator.

19. The apparatus of claim 16, wherein the uplink shared channel comprises data traffic.

20. The apparatus of claim 16, wherein the priority rule covers a physical uplink shared channel that is eligible to comprise the uplink control information.

21. The apparatus of claim 16, wherein the repetition of the channel signal comprises the repetition of a physical uplink control channel (PUCCH).

22. An apparatus for wireless communication, comprising:
    a memory; and at least one processor coupled to the memory, the memory and the processor configured to:
    determine that a repetition of a channel signal will collide with a resource scheduled for another channel comprising an uplink shared channel that would include uplink control information;
    apply a priority rule to determine whether to transmit the repetition or to refrain from transmitting the repetition, wherein the priority rule covers the other channel comprising the uplink shared channel that would include the uplink control information; and
    transmit the repetition when the priority rule indicates to transmit the repetition.

23. The apparatus of claim 22, wherein the priority rule indicates that the repetition of the channel signal has a higher priority than transmission of the uplink shared channel that would include the uplink control information.

24. The apparatus of claim 22, wherein the uplink control information comprises at least one of an acknowledgement, a negative acknowledgement, a scheduling request, or a channel quality indicator.

25. The apparatus of claim 22, wherein the uplink shared channel comprises data traffic.

26. The apparatus of claim 22, wherein the priority rule covers a physical uplink shared channel that is eligible to comprise the uplink control information.

27. The apparatus of claim 22, wherein the repetition of the channel signal comprises the repetition of a physical uplink control channel (PUCCH).

28. A non-transitory computer-readable medium storing computer executable code for wireless communication, comprising code to:
    determine that a repetition of a channel signal will collide with a resource scheduled for another channel comprising an uplink shared channel that would include uplink control information;
    apply a priority rule to determine whether to transmit the repetition or to refrain from transmitting the repetition, wherein the priority rule covers the other channel comprising the uplink shared channel that would include the uplink control information; and
    transmit the repetition when the priority rule indicates to transmit the repetition.

29. The non-transitory computer-readable medium of claim 28, wherein the priority rule indicates that the repetition of the channel signal has a higher priority than transmission of the uplink shared channel that would include the uplink control information.

30. The non-transitory computer-readable medium of claim 28, wherein the uplink control information comprises at least one of an acknowledgement, a negative acknowledgement, a scheduling request, or a channel quality indicator.

31. The non-transitory computer-readable medium of claim 28, wherein the uplink shared channel comprises data traffic.

32. The non-transitory computer-readable medium of claim 28, wherein the priority rule covers a physical uplink shared channel that is eligible to comprise the uplink control information.

33. The non-transitory computer-readable medium of claim 28, wherein the repetition of the channel signal comprises the repetition of a physical uplink control channel (PUCCH).

* * * * *